United States Patent [19]
Menzel et al.

[11] 3,939,441
[45] Feb. 17, 1976

[54] STRUCTURAL ARRANGEMENT FOR ELECTRONIC MODULES

[75] Inventors: Willi Menzel, Gauting; Gundolf Milde, Munich, both of Germany

[73] Assignee: Siemens Aktiengesellschaft, Berlin & Munich, Germany

[22] Filed: Sept. 20, 1973

[21] Appl. No.: 399,259

[30] Foreign Application Priority Data
Sept. 22, 1972 Germany............................ 2246611

[52] U.S. Cl................ 333/70 R; 333/70 S; 333/79
[51] Int. Cl.².................... H03H 7/04; H03H 13/00
[58] Field of Search......... 333/73 S, 70 R, 70 S, 79, 333/84 M, 84 R, 6, 8, 9, 32, 33, 97 R; 317/101 R, 101 CM, 101 CC, 101 CW, 101 D

[56] References Cited
UNITED STATES PATENTS

| | | | |
|---|---|---|---|
| 2,915,716 | 12/1959 | Hattersley........................... | 333/73 S |
| 3,300,686 | 1/1967 | Johnson et al.............. | 317/101 DH |
| 3,519,959 | 7/1970 | Bewley et al..................... | 333/84 X |
| 3,680,005 | 7/1972 | Jorgensen et al...................... | 333/6 |

OTHER PUBLICATIONS

Abdel–Latif et al – "A New Interference–Free High-–Speed Monolithic Digital Integrated Gate" in A.E.U. 24, 1970, pp. 263–268.

Rogers – "The Theory of Networks in Electrical Communication and Other Fields" MacDonald: London 1957; pp. 156–157.

*Primary Examiner*—Archie R. Borchelt
*Assistant Examiner*—Marvin Nussbaum

[57] ABSTRACT

An electronic module designed for maximum switching speeds is described. It contains parallel strip conductors having spacings much smaller than their widths and serving as two-dimensional outgoing line and two-dimensional return line of the direct-current supply. The strip conductors are bridged by one or more additional capacitors, particular spacings being provided between the individual additional capacitors and between such additional capacitors and the edge of the strip conductors.

13 Claims, 4 Drawing Figures

STRUCTURAL ARRANGEMENT FOR ELECTRONIC MODULES

BACKGROUND OF THE INVENTION

The invention relates to an electronic module, more particularly a flat module comprising parallel strip conductors, i.e., flat electric conductors whose spacings from one another are much smaller than their widths. The strip conductors can, for example, serve as two-dimensional outgoing lines and two-dimensional return lines for a direct-current supply.

The knowledge of the manufacture and application of modules of this type, more particularly flat modules, has already substantially matured, but the invention described herein does offer significant improvement.

It is generally known that multilayer flat modules may contain several transmission line planes, one of said planes being a two-dimensional out-going line and another of the planes a two-dimensional return line for, e.g., a direct-current supply. The lines thus constitute strip conductors over which current-consuming components, e.g., specific gates, disposed on the module are supplied with the necessary direct voltage.

Such a module is, for example, described in the periodical publication "Computer Design," of February 1965, pp. 28–39, where the strip conductors of the direct-current supply constitute two adjoining planes D and C. By means of the two-dimensional construction of the direct-current supply a shielding effect is additionally desired between the timing pulse line accommodated in the plane D and the signal line planes mounted on the other transmission line plane C.

Similar arrangements are widely known, see e.g., "Electronics," May 13, 1960, pages 77–78, West German Unexamined Pat. application 1,132,202, FIGS. 2a and 4b; U.S. Pat. No. 3,300,686, FIGS. 10 and 11. The latter patent describes a module (large card 19) containing neighborning parallel transmission line planes disposed at regularly spaced distances from one another, of which the two outermost are the signal line planes and the two innermost the strip conductors for the direct-current supply. Here, too, the shielding function of the strip conductors is also utilized, namely, in conjunction with rapidly switching elements mounted on the module, of which interfering voltages are produced in the signal line planes due to the extraordinarily rapid switching of the elements, e.g., by switching processes lasting about 5 nanoseconds.

The interfering voltages produced by such rapid switching processes in the signal line planes of the module have also been investigated in the article published in the NTZ 1971, pp. 541–544, in particular as to the strength of the crosstalk between the signal lines of such a module.

In "Elektronische Rechenanlagen," 10, 1968, No. 4, pages 177–179, the influence of interfering voltages of a different kind is investigated by means of examination methods usually applied in high frequency engineering. These voltages are of a type which in the direct-current supply of flat modules in the event the components to be switched rapidly are accommodated in or on the flat module at great distance from the terminals on the module over which the direct-current supply for it is provided. It was at the same time assumed that the interfering voltages would depend on variations of the resistances of the direct-current supply inputs of the switching component. It was recommended as a remedial step that in the area of the terminals of the module a shunt capacitor be inserted between the strip conductors and a series resistance into one of the conductors of these strip conductors, namely in the area of the bridging capacitance. The series resistance is matched to the characteristic impedance of the strip conductors. This series resistance absorbs, because of its matching, the interfering voltage waves generated by the component and traveling along the strip conductors to the series resistance. To avoid excessive direct-current dissipation on this series resistance, it is, likewise, recommended that the characteristic impedance of the direct-current supply lines be made small so that the resistance valve of the series resistance can be made small. Apparently, particular attention was paid to cross sections of these direct-current supply lines which are illustrated in FIG. 3 of this publication and which already have a comparatively small characteristic impedance referred to lines normally employed in high-frequency engineering. Therefore, in this case the interfering voltages on the direct-current supply line are not already suppressed in the area of the switching element, but they are only prevented from being reflected and thereby from from frequently traveling back and forth between the component and the terminals or between the component and the battery. Thus, in this publication the interfering voltage travels only once from the component where it is generated to the series resistance which absorbs the interfering voltage. Hence, the remedial step of absorption in the area of the direct-current supply terminals of the module recommended here cannot prevent the interfering voltage from causing unwanted interferences in other components connected to the same direct-current line during its non-recurring travel from the component to the series resistance. What is prevented is that the interfering voltage remains active on the directcurrent supply line for a prolonged period in the absence of absorption.

It is furthermore to be noted that the strip conductors of the directcurrent supply shown in FIGS. 10 and 11 of U.S. Pat. No. 3,300,686 apparently have a still lower characteristic impedance than the lines recommended in FIG. 3 of the publication "Elektronische Rechenanlagen", 10. Thus, in the module shown in the U.S. patent referred to above a shunt capacitor could, where necessary, be placed in the area of the terminals along with a series resistance whose resistance value could be made still smaller than that which must be provided in the direct-current supply lines recommended in the publication "Elektronische Rechenanlagen," 10.

AEU 24, 1970, pages 263 to 268 reports on measurements which confirm that at the moment of switching a component connected to the directcurrent supply there arises extremely high, short-time interfering voltages on the direct-current supply lines. It is true that in this reference these interfering voltages are attributed to the saturation of the modules provided in the gate and connected with the edge steepness of the direct-current change in the direct-current supply for the electronc components, particularly the transistors, provided in the gate. This, of course, contradicts the investigations reported in the above mentioned publication "Elektronishe Rechenanlagen," 10, where such interfering voltages are attributed to the change in the resistance of the direct-current supply inputs of the component upon the switching thereof. The difference between the two reasons for the generation of such interfering voltages is relatively small, because also the relevant edge steepness of the direct-current variation caused by the saturation can be interpreted as a time-controlled, even if continuous, variation of the resistances at the direct-current supply inputs of the component.

The investigations referred to in the above identified publication "AEU" have shown that the interfering voltages would, above all, also depend on the inductance of the direct-current supply lines. It is particularly disturbing, according to this publication, if this inductance is large, i.e., if the length of the direct-current supply lines is comparatively large. The remedial measure recommended therein consists in connecting shunt capacitors of very high capacitance C1, C2, C3 directly to the direct-current supply inputs of the component part (see FIG. 15). These cause a rapid attenuation of the interfering voltages in conjunction with resistors R disposed in the component (see particularly page 268, left-hand column, last paragraph, to the end of the right-hand column). The interfering voltages then scarcely diffuse to the direct-current supply lines but are largely suppressed on the site where they are generated.

There are also flat modules comprising parallel strip conductors with spacings much small than the widths thereof, whereby the strip conductors constitute the two-dimensional outgoing line and return line of the directcurrent supply. In this case, the strip conductors are bridged by shunt capacitors of very high capacitance, e.g., several uF, at specific points lying not directly at the direct-current supply inputs of the components and also not only in the area of the terminals of the component. In this case, not only one of the two strip conductors, but also the other strip conductor serves to diffuse reference potentials to which the signals of the signal lines are referred. Due to the shunt capacitors of extremely high capacitance, practically none of the high-frequency interfering voltages can be diffused without hindrance, because these bridged strip conductors constitute a low-pass filter with too low a cut-off frequency. The low-pass filter in this case essentially consists of series inductances produced by the self-inductance of the strip conductor segments between the shunt capacitors or between strip conductor edge and neighboring shunt capacitor, and of shunt capacitances produced essentially by the shunt capacitors.

It is, therefore, an object of the invention to provide means for suppressing interfering voltages that appear and could diffuse to the direct-current supply strip conductors in the course of switching processes in component parts, e.g., in gates, without the necessity of additionally providing the above mentioned remedial measures, namely, attenuated shunt capacitors of very high capacitance connected directly to the direct-current supply inputs of the switching elements and/or one or more shunt capacitors of very high capacitance in conjunction with a series resistance matched to the characteristic impedance of the direct-current supply strip conductors and located in the area of the terminals of the module. Such shunt capacitors of very high capacitance shall, as well, not be provided alongside the strip conductors. However, the solution in accordance with the invention shall in special cases permit the additional provision of at least the two prior art remedial measures first mentioned whereby, however, the shunt capacitors to be provided need only have smaller capacitances than would otherwise be necessary if said prior art remedial measures are applied. Moreover, it must also be possible to employ the direct-current strip conductors at the same time and at least partly for the shielding between different signal planes.

SUMMARY OF THE INVENTION:

In accordance with the invention, the foregoing and other objects are achieved by the provision of a module equipped with parallel strip conductors, whose spacings are much smaller than the width thereof, and serving as two-dimensional outgoing line and two-dimensional return line, direct-current supply. The module within the framework of the invention is characterized by the fact that on the strip conductors bridged by one or more additional capacitors, the spacings of neighboring additional capacitors from one another and the particular spacing of the edge of the strip conductors to the next additional capacitors are so small that low-pass filters formed by two adjacent additional capacitors and the segment of the strip conductors lying between said two additional capacitors and low-pass filters formed by the additional capacitor lying next to the edge of the strip conductors and the segment of the strip conductors lying between said additional capacitor and the edge of the strip conductors have a larger cut-off frequency than the maximum frequency of the frequency components (produced parasitically with high energy) of the interfering voltages on the strip conductors which are generated in the strip conductors upon the switching of electronic components connected to the direct-current supply.

In addition, according to the invention, in the module the characteristic impedance of the direct-current supply lines is quite small -- it may be substantially below 1 ohm, e.g., 0.1 ohm, and even much less --, because the additional capacitors provided reduce the characteristic impedance of the strip conductors.

Further reduction of the characteristic impedance of the strip conductors is possible because the mutual spacing of the strip conductors is reduced to a minimum, e.g., 0.2 mm if the width is 100 mm. Further details will be given hereinbelow of the special importance of the extremely low characteristic impedance of the strip conductors of the direct-current supply of the module according to the invention.

BRIEF DESCRIPTION OF THE DRAWINGS

The principles of the invention will be more readily understood by reference to the description of a preferred embodiment given hereinbelow in in conjunction with the accompanying drawing, wherein.

DETAILED DESCRIPTION OF THE DRAWINGS

Figure 1:
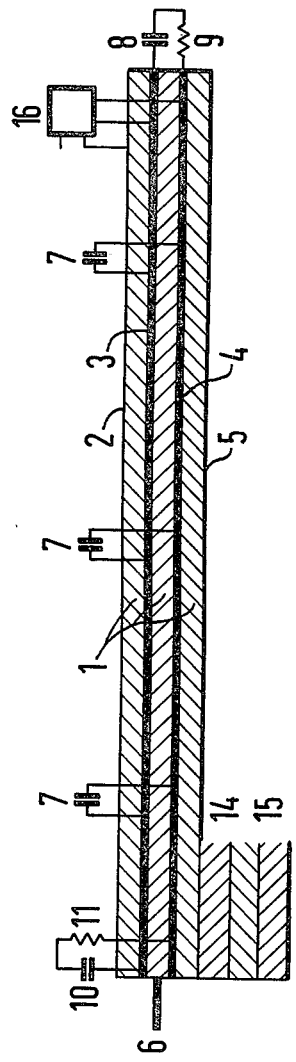
FIG. 1 is a side cross section of the embodiment of the module according to the invention.

The sectional view of the FIG. 1 module according to the invention, which is a flat module, comprises four contiguous parallel transmission-line planes 2, 3, 4 and 5, of which the two outermost transmission line planes 2 and 5 are the signal line planes, and the two innermost transmission line planes 3 and 4 are the strip conductors for the direct-current supply. In this embodiment, the conductor 4 of the strip conductors has the same width 16 as the entire flat module (see FIG. 2), whereas the other conductor 3 of said flat module, as drawn in broken line, is considerably narrower, and, strictly speaking, consists of two different parallel strip conductors of the direct-current supply linked together at the beginning and at the end. However, the form of the strip conductors may also be selected completely differently, e.g., the strip conductor 3 may be as wide as the strip conductor 4. Instead of these four transmission line planes, only three transmission line planes, for example, 2, 3, and 4, or also more than four transmissionline planes, for example, also 14 and 15, may be provided.

The strip conductors 3 and 4 are connected to several terminals 6 of the module over which the direct-current supply of the module is provided. The current paths of the signal line planes 2 and 5, not shown in the drawing in the interest of clarity, are connected over other such terminals 6.

Upon operating the components disposed in or on the module, there normally occurs in the strip conductors 3 and 4 interfering voltages whose time waveform can be divided into frequency components through the Fourier analysis. With such operations many of the frequency components are produced with such energy that the sum of them causes significant interferences. Other frequency components do appear but they have so little energy that their sum is negligible as far as interferences are concerned. Further, there is a maximum frequency value for the high energy frequency components.

Figure 2:
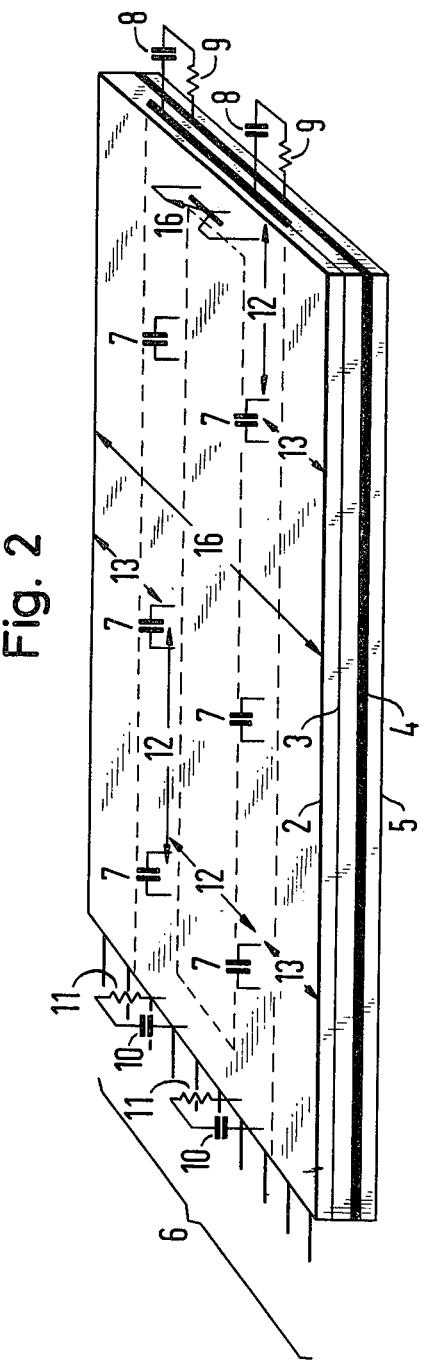
FIG. 2 is an oblique view of said embodiment.

Each of two additional capacitors 7, adjoining each other, produce a low-pass filter with a specific cut-off frequency in conjunction with a segment 12 (FIG. 2) of the strip conductors 3 and 4 lying therebetween (see FIG. 2). Likewise, an additional capacitor 7 adjacent to the edge of the strip conductors 3 and 4 also produces, in conjunction with a setment 12, a low-pass filter with a given cutcut-off frequency between said additional capacitor 7 and the edge of the strip conductors 3 and 4. Provision is made within the scope of the invention, whereby the spacings 12 of the additional capacitors 7 adjoining each other and the particular spacing 13 of the outer border of the strip conductors 3, 4 to the additional capacitor 7 disposed nearby are so small that the low-pass filters have clearly larger cut-off frequencies than the upper frequencies of the higher energy frequency components of the interfering voltages generated upon the switching of the switching elements 16.

Thus, in this embodiment the cut-off frequencies of the low-pass filters are at so high a value that the relatively low interfering voltages generated by the switching element 16 are not reflected at these low-pass filters, which may be resonant circuits, but can spread out without hindrance over the strip conductors 3, 4 of the direct-current supply, as if a homogeneous strip conductor 3, 4, i.e., as if no such resonant circuits were present in the strip conductor. Resonant circuits whose cut-off frequencies are too low so that the remaining interfering voltages cannot spread out without hindrance over the strip conductors 3, 4 of the direct-current supply can cause at least the partial storing and relatively slow decay of the energy of the interfering voltages in the low-pass filters forming such resonant circuits, thereby increasing in very unfavorable cases the danger that interfering voltages act parasitically on the other electronic components disposed on the module.

Thus, as a result of the measure taken within the scope of the invention, the local storing of interfering voltage energies which is practically concentrated on a small resonant circuit/strip conductor segment, is avoided so that the danger of interference of components disposed nearby is avoided.

The very low characteristics impedance, discussed hereinabove, of the strip conductors of the direct-current supply of the module according to the invention has an additional interference-reducing influence. It is caused by the design of the lines as strip conductors and by the additional capacitors 7 provided according to the invention and bridging the strip conductors (see also FIG. 1). The characteristic impedance of the strip conductors 3, 4, which are bridged with additional capacitors 7, yields the unexpected result that the special interfering voltages referenced hereinabove, which otherwise arise in the direct-current supply during switching processes of switching elements disposed on the module and supplied with direct current, e.g. the inversion gate 16 indicated only symbolically in the figures, are at least largely avoided for the reasons stated hereinbelow, even if no special shunt capacitors of high capacitance are provided.

As shown by the research methods customary in high frequency engineering, interfering voltages are generated between the strip conductors 3, 4 shown in FIG. 1 in the event the switching elements, e.g. the inversion gate 16, disposed in or on the module switch from the first to the second switching condition. The direct voltage of the direct-current supply can be considered as an electromagnetic "wave" having zero frequency, whereby such a wave travels from the direct-current generator to the component and produces a reflected wave there which travels back to the direct-current generator. Thus, a forward wave and a reflected backward wave are superimposed upon the strip conductors. The interfering voltages can first be viewed as an irregularly starting direct-current "wave," which is produced by the switching element 16 through the switching process thereof and which travels along the strip conductors 3, 4 to the terminals where these interfering voltages are frequently reflected once again.

These interfering voltages can be computed approximately by means of the reflection factor of the direct-current supply inputs of the switching element, as shown likewise for a special case reported in "Elektronische Rechenanlagen" 10. In this special case, it was assumed that the component had an infinitely large resistance in one of its two switching states. Special investigations of a general nature, i.e., with arbitrarily large resistances at the direct-current supply inputs in the two switching states, have shown that in the first switching state, a fixed amplitude Ur1 of the reflected wave is produced in accordance with the reflection factor $r1$ caused by the component. However, immediately after the switching of the component, i.e., in the second switching state, during the period that the resistance at the direct-current supply inputs of the component comes to the other extreme value, another reflection factor $r2$ and, with it, another fixed amplitude Ur2 of the reflected wave is produced before the amplitude of the forward wave could change. The difference between the amplitudes of the reflected waves Ur1–Ur2 represents the interfering voltage produced by the component. This amplitude of the interfering voltage is -- aside from a factor independent of the reflection factor $r2$ -- proportional to the difference of the reflection factors $\Delta r = |r1-r2|$ of the two switching states. Thus, strictly speaking, the amplitude of the direct voltage wave or interfering voltages produced depends on the change of the reflection factor $r$ caused by the switching of the component 16; the reflection factor $r$ of this switching element is defined by the equation $r = (R-z)/(R+Z)$, where R stands for the resistance between the direct-current supply inputs of the switching elements 16 and Z the characteristic impedance of the direct-current supply strip conductors 3, 4.

The change $\Delta r$ of the reflection factor, dependent upon the characteristic impedance, upon the switching of the component 16, thus causes the unwanted interfering voltage. In principle, this result also holds true if, instead of the sudden transition, a more continuous, but also rapid, transition, from the first to the second switching state is assumed such that during the switching process the forward wave still could not attain the amplitude appearing in the transient state. One has to substitute the maximum value, which may amount to $\Delta r$ during the switching process, in order to determine the approximate maximum amplitude of the interfering voltage.

The invention takes as a basis, among other things, that by reducing the characteristic impedance Z between the direct-current supply strip conductors 3, 4, it can be achieved that the resistance R between the direct-current supply inputs of the switching element is made largely independent of the switching condition of the element -- namely, always very large as compared to the characteristic impedance Z of the strip conductors 3, 4: $Z<<R$ with $Z = \sqrt{l/c}$; $l$ = inherent series inductance of the strip conductors; c = the sum of the inherent shunt capacitance of the strip conductors and the capacitance of the additional capacitors. Thus, the reflection factor $r$, independent of the switching condition of the switching element, invariably approximates 1, in accordance with $r = (R-Z)/(R+Z) \approx 1 - 2Z/R \approx 1$, so that the reflection factor $r1$ in the first switching condition of the switching element differs only slightly from the reflection factor $r2$ in the second switching condition of the switching element, so that also $\Delta r \approx 0$. Therefore, due to the switching of the element, practically no more interfering voltages are produced, or the interfering voltages generated by the switching element are so insignificant that they no longer interfere with other electronic elements which are likewise connected to the direct-current supply over the direct-current supply strip conductors 3, 4. This is true even if the prior art remedial measures, namely, specific shunt capacitors of very high capacitance, are not provided for eliminating such interfering voltages. The measure according to the invention thus comprises making the reflection factors of the switching elements disposed on the flat module practically independent of the switching state of the switching elements by reducing to a minimum the characteristic impedance of the direct-current supply strip conductors. The latter reduction is accomplished by means of the additional capacitors, because during the switching substantially no more interfering voltages are generated, i.e., no interfering voltages are to be suppressed subsequently, either on the site of their appearance or in the vicinity of the terminals 6 of the module. In addition, as a result of the measure according to the invention, the cut-off frequency of the low-pass filters producing the strip conductors is made so large that the remaining interfering-voltage energies generated are not stored locally in such low-pass filters. There is no need for installing expensive high-capacitance, short-circuit producing shunt capacitors, for the additional capacitors to be mounted within the framework of the invention can have much lower capacitances.

If only a single additional capacitor is installed which reduces the characteristic impedance, it can be provided in the center of the module so that its capacitance can be extremely low.

Any additional capacitor(s) can also be mounted subsequently in modules containing strip conductors for the direct-currrent supply.

Furthermore, according to the invention, the reduction in characteristic impedance permits the additional provision of the prior art remedial measures, namely, the installation of particular shunt capacitors 10 of very high capacitance in the area of the terminals 6 of the module and/or directly at the direct-current supply inputs of the components, should this prove to be necessary in special cases. However, the capacitance of said shunt capacitors can also be made relatively low, due to the much smaller amplitude of the interfering voltage in the module according to the invention in comparison with prior art modules.

In a further development of the module construction according to the invention, provision is made whereby the resistance between the inputs for the direct-current supply of electronic components to be switched, e.g. 16, is made much larger than the characteristic impedance of the strip conductors bridged by the additional capacitors independently of their particular switching condition. To achieve this purpose, the switching element may, for example, be made in accordance with the metallic oxide (MOS) technique, by which, even in the conductive state, it generally still has a very high resistance so that input resistance for the direct-current supply of the component, even if the latter is of low resistance, is extremely large compared with the characteristic impedance of the strip conductors. The ratio of the input resistance for the direct-current supply in its low-resistance condition to the characteristic impedance of the strip conductors for the direct-current supply can then readily exceed the factor 100, so that the amplitude of the interfering voltages generated by the switching element cannot be more than a small percentage of the direct-current supply voltage applied to the terminals. The interfering voltage amplitude is particularly low due to the extremely small reflection factor change $\Delta r$ then prevailing. Normally, an amplitude of interfering voltage of this value is harmless even then, if a large number of switching elements disposed on the same module are switched concurrently, the individual interfering voltages generated thereby are superimposed in the same direction. Only in special cases is it necessary to provide the prior art remedial measures, namely the particular shunt capacitors, in order to suppress the effects of the interfering voltages.

As mentioned herinabove, it is normally not necessary in the module designed according to the invention to insert a series resistance between the terminals for the feeding of the direct-current supply and the strip conductors, so as to bring about a subsequent absorption of the interfering voltages produced, as recommended in "Elektronischen Rechenanlagen" 10.

In order to improve the constancy of the direct-current supply, one or more shunt capacitors of very high capacitance may be provided on the module, for example, in the area of the terminals 6, so as largely to reduce the fluctuations of the direct voltage.

Furthermore, the series resistance provided in the prior art remedial measures may also be inserted into the strip conductors 3, 4 so as to absorb interference voltages.

In the embodiment shown in the drawings, the high-capacitance shunt capacitor 10 causes the equilization of the variations in the voltage of the battery, or at the terminal 6 over which the direct-supply is fed to the module, even if in and of themselves certain variations of the direct-current supply voltages would be caused by other modules connected to the same battery. At the same time, by means of the shunt capacitor 10 which produces a short circuit, interfering voltages generated in the module according to the invention no longer interfere -- over the terminals 6 -- with other modules connected to the same battery. Thus, a series resistance (not shown) provided additionally would serve to absorb the interfering voltages.

In a further development of the embodiment having the shunt capacitor, e.g. 10, a provision is made whereby instead of the aforementioned series resistance the internal resistance 11 of the shunt capacitor 10 is selected or adjusted through additional steps such that the internal resistance 11 is matched to the characteristic impedance of the strip conductors 3, 4 for the subsequent absorption of interfering voltages produced. Thus, in this embodiment it is avoided that the aforementioned series resistances are inserted into the strip conductors 3, 4 for the series resistances in such modules are not only frequently accompanied by certain production engineering difficulties, but they also cause great losses in the direct-current power, in particular by reason of the hearing brought about by direct current from the direct-current supply. However, there is no power loss in the direct-current supply on the internal resistance 11 of the shunt capacitor, because only the interfering voltages are absorbed in the relevant internal resistance, and there is no direct-current flow therein from the direct-current supply. Since the internal resistance 11 of the high-capacitance shunt capacitors 10 is often more strongly variable with frequency, care should be exercised that the matching of the internal resistance 11 to the normally frequency-independent characteristic impedance of the strip conductors 3, 4 is optimal, at least in the area of the frequency components of the interfering voltages generated with high energy, as determined by Fourier analysis.

In another further development, there is provided at the end of the strip conductors 3, 4 facing the terminals 6 of the module one or more high-capacitance shunt capacitors 8, where necessary also with internal resistances 9 matched to the characteristic impedance of the strip conductors 3, 4, so as to reduce fluctuations of the direct voltage there appearing or -- upon matching the internal resistances 9 -- to absorb such interfering voltage waves which initially travel to an end of the strip conductors 3, 4.

In a further development of the invention, there are provided in the module several strip conductors bridged by additional capacitors for purposes of the direct-current supply instead of only one single strip conductor 3, 4. Such an embodiment of this further development is shown dotted in FIG. 2, where two different strip conductors 3 are provided and are arranged parallel to one another and extending from the terminals 6 to the end of the module facing these terminals. In addition, the two strip conductors 3 are intermeshed in the embodiment shown in FIG. 2 in that they are linked together conductively within the module both in the area of the terminals 6 and in the area of the oppositely lying end of the module.

Because in the module there are provided for the direct-current supply several strip conductors bridged by additional capacitors, the interspaces between the strip conductors in the plane thereof can be utilized for other purposes, for example, for the feeding of an additional direct-current supply having different potentials. As a result of the intermeshing of the strip conductors, it is achieved that voltage differences between the various intermeshed strip conductors can largely be avoided along the entire length thereof or that the heat of the various strip conductors provided is distributed more evenly throughout the entire module than is the case without intermeshing.

In a further development of the invention, a provision is made whereby the mutual spacings (see 12) of adjacent additional capacitors and the spacings (see 13) from the edge of the strip conductors 3, 4 to each adjacent additional capacitor are made substantially smaller (e.g. 20 percent) than the theoretical length which the interfering voltage would travel along the strip conductors bridged by additional capacitors during the switching process of the switching elements, if said bridged strip conductors were sufficiently long for this purpose. Thus, if the switching process lasts 5 nanoseconds, the interfering voltage on the strip conductors bridged by the additional capacitors during this period of the switching process would pass through a specified theoretical length if the conductors were adequately long for this purpose. Thus, the theoretical length over which the interfering voltage would travel during the switching process of the switching element shall be substantially greater than the distance between two adjacent additional capacitors 7 and also substantially greater than the distance of each point of the edge of the strip conductors to the adjacent additional capacitor. Investigations have shown that the amplitudes of the interfering voltages then become still smaller, as when the special design is not yet provided. The investigations have likewise shown that the interfering voltages can even be made smaller if not only the distance 12 between additional capacitors 7, but the entire length of the strip conductors 3, 4 within the module is made substantially smaller than said theoretical length.

Admittedly, in the embodiment shown in FIGS. 1 and 2, involves a multilayer flat module requiring very little space, in which the two-dimensional strip conductors are provided in two adjacent conductor planes. Moreover, such a design can be made very simply. In particular, it is easy to make the distance between the strip conductors 3, 4 relatively small, e.g., 0.2mm and less, so that the characteristic impedance of the strip conductors 3, 4 is also reduced advantageously thereby. However, the module according to the invention and the further developments thereof can also be designed differently, for example, they can be slide-in units having any desired external form.

Provision is made in a further development, whereby the direct current appearing at the input for the direct-current supply of switchable component disposed on the module is at least largely independent of the particular switching condition of the component. This will be more readily understood by reference to FIG. 3.

Figure 3:
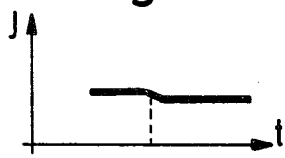
FIGS. 3 and 4 are direct-current timing diagrams.

Thus, this step is characterized by the fact that the direct current at the input for the direct-current supply of the switchable component 16, for example, a gate or a flip-flop circuit, is independent of the permanent switching condition of the component, or at least largely independent thereof (see also FIG. 3). As a result, no load variations, or at least no significant load variations, occur on the lines 3, 4 for the direct-current supply of the module during the switching of the component 16. The interferences caused by such load variations which are particularly disagreeable when there are very rapid transitions from one switching condition to the other switching condition of the module are thus largely avoided, since the directcurrent consumption in each switching condition is equally large, so that a reliable operation of all components 16 disposed on the module is largely assured even at very high switching frequencies or with very rapid transitions between the different switching conditions of the components. Thus, the static input resistance for the direct-current supply of the switchable component(s) 16 is generally independent of the switching condition.

Figure 4:
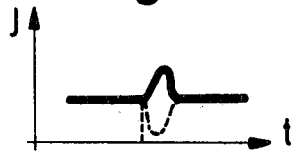

Components, whose inputs for the direct-current supply exhibit a switching condition independent of the input resistance, are abundantly known in the prior art. See, for example, West German Examined Pat. application 1,196,241 and "Elektronische Rechenanlagen" 1 (1959(, No. 1, pages 20–22, particularly FIG. 4, as well as the current-mode-switch components in the extensive publication "Transistor Circuit Design," Texas Instruments, Inc., 1963. In addition, C-MOS components have recently been introduced which likewise, independently of their switching condition, consume nearly always the same direct current, i.e., virtually no direct-current. See, for example, Proc. IEE, 55 (1967), pages 1121–1122; further, Elektronik 1971, No. 4, pages 111–116, and RCA, Application Note ICAN 5593 of December 1967.

If all components of the module are constructed in this manner, there is considerable protection against interference in the module.

It is of particular advantage if, in addition, the input resistance of the relevant components 16 is made as large as possible in comparison with the characteristic impedance of the lines 3, 4 for the direct-current supply of the module, because the power dissipation is reduced, but, above all, also because then slight variations of the direct current required by the relevant component in the different switching conditions are too insignificant for the variations to produce greater interferences on the lines for the direct-current supply of the module. The C-MOS components referenced hereinabove are particularly suited for these steps for purposes of further improvements.

Insofar as during the switching process, despite the use of the invention, transitory strong peaks (developed, e.g., in the manner shown in FIG. 4) are still superimposed on the direct-current supply input of the component 16, particularly due to transfer of line capacitances (in C-MOS components the switching operation itself is the only time when the direct-current power can still exhibit considerable magnitude, whereas otherwise these components hardly consume any power at all for the direct-current supply), a low capacitance can, if necessary, be provided additionally at the input of the component 16. Low-capacitance shunt capacitors, e.g., 10 or 100 pF, which only require very little space, are suitable for this purpose. In this case, not only the static, but also the dynamic, input resistance of the direct-current supply for the component is largely independent of the switching condition.

The description of preferred embodiments of the invention given hereinabove is only exemplary of the principles of the invention and does not define the scope of the invention. The scope of the invention is defined by the appended claims.

We claim:

1. An electronic module of flat construction having a plurality of parallel strip conductors with spacing between said strip conductors being less than the width of those conductorrs, at least a pair of said strip conductors having terminals at ends thereof for connection to a source of current and being constructed to form two dimensional outgoing and incoming lines for a current supply to operating components mounted on said module comprising:

a plurality of adjacent first capacitors connected between said outgoing and incoming lines and low pass filter means formed by pairs of said adjacent first capacitors and the segments of said incoming and outgoing lines lying between said pairs of first capacitors and formed by those of said first capacitors lying closest to any edge points of said strip conductors and segments of said incoming and outgoing lines lying between said edge points and said first capacitors lying closest to said edge points, said adjacent first capacitors being spaced one from the other and the distance from edge points of said incoming and outgoing lines to said first capacitors, respectively, lying closest to said edge points being sufficiently small as to form a said low pass filter means having a greater cut off frequency than the highest frequency component of interfering voltages occurring on said incoming and outgoing lines upon operating electronic components connected to said current supply.

2. The module defined in claim 1 wherein the impedances between inputs of said current supply to said strip conductors are made greater than the characteristic impedances of said strip conductors.

3. The module defined in claim 1 further comprising: at least a second capacitor having a capacitance value relatively greater than a said first capacitor connected between said strip conductors adjacent said terminals thereon forming a shunt capacitance.

4. The module defined in claim 3 wherein said shunt capacitance has an internal resistance matched to the characteristic impedance of said strip conductors.

5. The module defined in claim 1 wherein said strip conductors are intermeshed.

6. The module defined in claim 1 wherein said spacing of said first capacitors and said distance of an edge point of said incoming and outgoing lines to the one of said first capacitors lying closest thereto is substantially less than the theoretical length which an interfering voltage would travel along said strip conductors when shunted by said first capacitors.

7. The module defined in claim 1 wherein the characteristic impedance of said strip conductors is less than 0.10 ohm.

8. The module defined in claim 1 wherein said current source is directly connected to said terminals, whereby no resistors are interposed in the direction of current flow through said incoming and outgoing lines.

9. The module defined in claim 1 wherein said strip conductors are arranged to form a multilayer, generally flat assembly.

10. The module defined in claim 1 wherein the remainder of said strip conductors are signal lines and wherein the distance between said outgoing and incoming lines is small in relation to the distance between said outgoing and incoming lines and said signal lines.

11. An electronic module having parallel strip conductors and a pair of said strip conductors forming two dimensional incoming and outgoing lines for current supply, the spacing between said parallel strip conductors being smaller than the widths of said incoming and outgoing lines, comprising:
   a plurality of terminals for making connections to components on said module and
   a plurality of shunt capacitors connected between pairs of said strip conductors, said connection being made in portions of said module adjacent said terminals, said shunt capacitors having internal resistance values matched to the characteristic impedance of said strip conductors.

12. The module defined in claim 11 wherein said shunt capacitors are connected between said strip conductors at the ends of said strip conductors connected to said terminals.

13. An electronic module of flat construction having a plurality of parallel strip conductors with spacing between said strip conductors being less than the width of those conductors, at least a pair of said strip conductors having terminals at ends thereof for connection to a source of current and being constructed to form two-dimensional outgoing and incoming lines for a current supply to operating components mounted on said module, comprising:
   a first capacitor connected between said outgoing and incoming lines and
   low pass filter means formed by said first capacitor and segments of said incoming and outgoing lines extending between those edge points of said incoming and outgoing lines closest to said first capacitor and said first capacitor,
   the distance between said first capacitor and said edge points being sufficiently small as to form said low pass filter means to have a greater cut off frequency than the highest frequency component of interfering voltages occurring on said incoming and outgoing lines upon operating electronic components connected to said current supply.

* * * * *